Oct. 4, 1960 V. D. DAILEY 2,954,882
MOLD HANDLING MECHANISM
Filed June 13, 1957 2 Sheets-Sheet 1
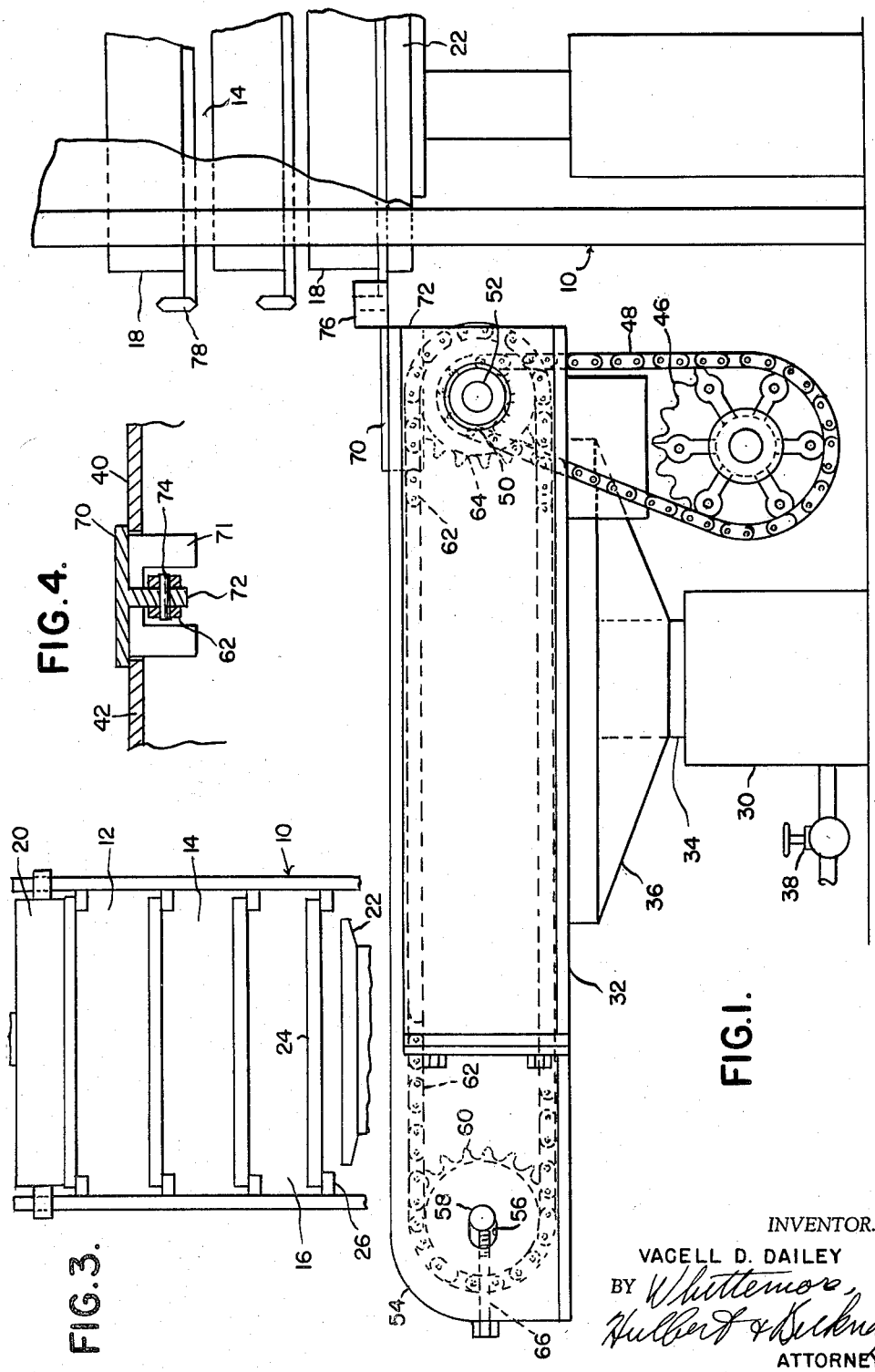
INVENTOR.
VACELL D. DAILEY
BY Whittemore,
Hulbert & Belknap
ATTORNEYS

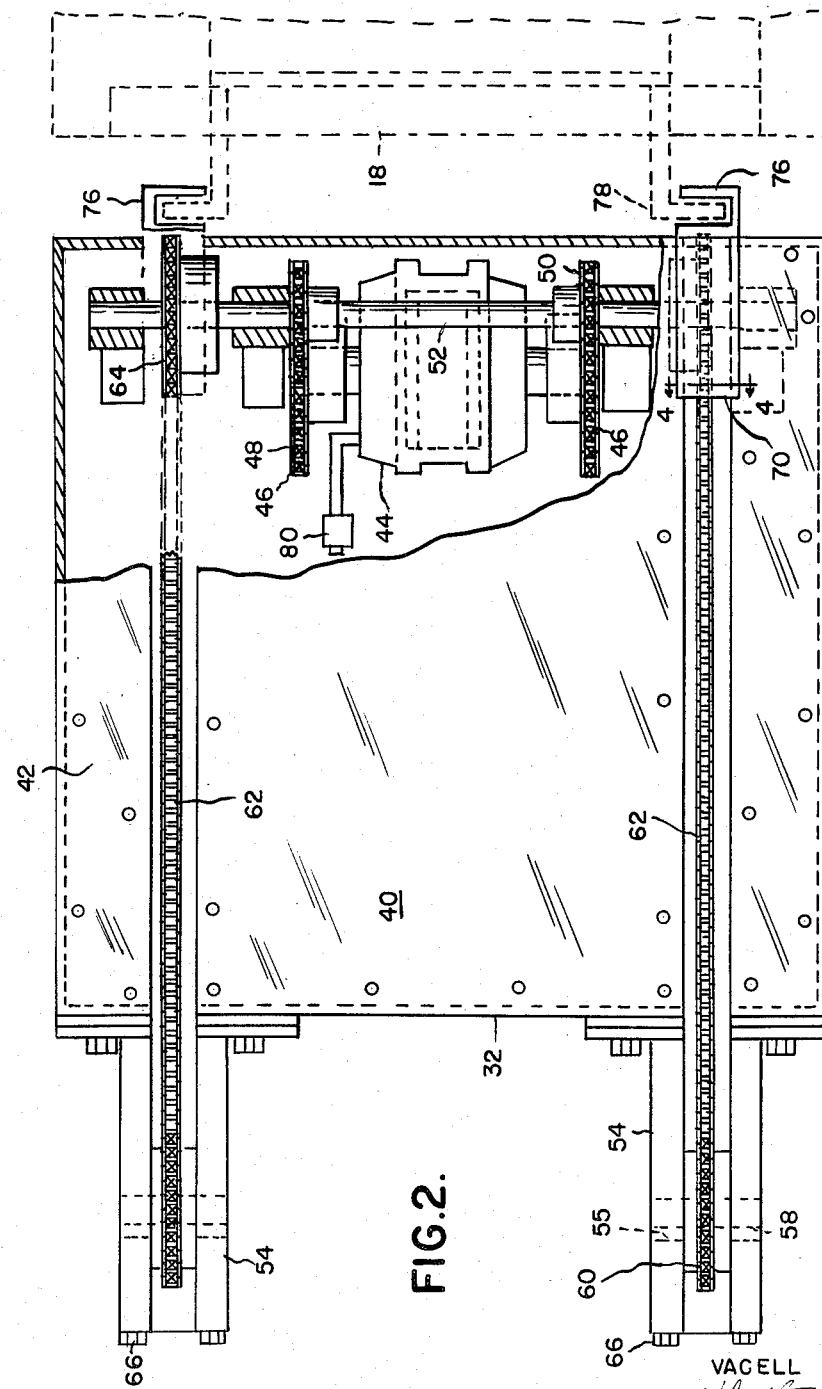

United States Patent Office 2,954,882
Patented Oct. 4, 1960

2,954,882

MOLD HANDLING MECHANISM

Vacell D. Dailey, Waterford, Mich., assignor to Baldwin Rubber Company, Pontiac, Mich., a corporation of Michigan Filed June 13, 1957, Ser. No. 665,508

1 Claim. (Cl. 214—16.4)

The present invention relates to mold handling mechanism.

It is an object of the present invention to provide mold handling mechanism designed for moving relatively heavy molds into and out of a plurality of vertically spaced compartments provided in a press.

It is a further object of the present invention to provide mechanism as described in the preceding paragraph which includes means for elevating a mold into horizontal alignment with a compartment, and slide means for traversing the mold into and out of a compartment.

More specifically, it is an object of the present invention to provide mold handling mechanism for effecting vertical and horizontal movement of a mold which includes selectively engageable coupling means on the molds and on horizontal slide means associated with the mechanism.

Still more specifically, it is an object of the present invention to provide mold handling mechanism for moving a plurality of molds each provided with a pair of oppositely facing vertically and laterally open hooks at one end thereof into and out of a plurality of vertically spaced press compartments, the mechanism including a pair of oppositely facing vertically and laterally open hooks on slide means associated with the mechanism and engageable with the hooks on the molds by relative vertical movement therebetween.

Other objects and features of the invention will become apparent as the description proceeds, especially when taken in conjunction with the accompanying drawings, illustrating a preferred embodiment of the invention, wherein:

Figure 1 is a side elevation of the mold handling apparatus showing a portion of a press and molds associated therewith.

Figure 2 is a plan view of the mechanism shown in Figure 1 with parts broken away.

Figure 3 is a fragmentary front elevational view of the press.

Figure 4 is an enlarged fragmentary sectional view on the line 4—4, Figure 2.

The present invention is applicable to the handling of molds or other articles of general application but was designed primarily for handling molds used in the rubber industry. More particularly, it was designed for use in association with a press indicated generally at 10 having a plurality of compartments 12, 14 and 16 into which molds 18 are inserted for curing. At the top the press is provided with a bolster 20 and at the bottom may be provided with a ram 22 for lifting movable platforms 24 upwardly to apply pressure to a series of molds. It will be observed that the platforms 24 are movable upwardly from supports 26 and pressure is transmitted upwardly through molds to the next adjacent upper platform. The press may include heating means if it is desired to vulcanize the products in the molds.

Inasmuch as the molds are relatively heavy considerable difficulty has been encountered in the past in handling the molds in a convenient manner. In accordance with the present invention mold handling mechanism is provided which under the control of the operator includes power means for moving the molds sequentially into alignment with a press compartment, and thereafter moving the molds horizontally into the press compartment.

The mold handling apparatus comprises a base 30 which includes power lift mechanism for effecting vertical movement of a table 32. The power lift mechanism may comprise a piston within a cylinder in the base 30, the piston being connected to a piston rod 34 which is connected to support structure 36 connecting the piston rod and table 32. Suitable means such as the valve 38, are provided for controlling the admission and exhaust of fluid to the cylinder to effect vertical movement of the table.

The table 32, as best seen in Figures 2 and 4, includes a relatively wide flat central supporting plate 40 and side plates 42 which are spaced apart to expose the interior of the table structure. Located below the table structure is a motor 44 which conveniently may be a rotary fluid motor having sprockets 46 connected thereto with drive chains 48 meshing with sprockets 50 located on a shaft 52 disposed just below the top of the table 32.

At one end the table 32 is provided with a pair of extensions 54 having elongated slots 56 in which shafts 58 are provided. Connected to the shafts 58 are sprockets 60 which connect to chains 62 passing over sprockets 64 located at the front of the mechanism. Chain tension may be adjusted by screws 66 bearing against the ends of the extensions 54 and having threaded connections with the shafts 58 on which the sprockets 60 are rotatable.

Connected to the chains 62 are slides indicated generally at 70, the slides 70 having depending flanges 72 coupled to the chains 62 by pivot pins 74. Depending guide means 71 extend downwardly from each of the slides 70 into the interior of the table 32 and have their edge portions in proximity to the side edges of the plates 40 and 42, as is best illustrated in Figure 4. At the ends of the slides 70 next adjacent the press 10, the slides are provided with oppositely facing vertically and laterally opening hooks 76, the conformation of which is best seen in Figure 2.

The molds 18 are provided at the ends thereof with a pair of oppositely facing vertically and laterally open hooks 78 which are selectively engageable and disengageable with respect to the hooks 76 by relative vertical movement therebetween.

The admission and exhaust of fluid under pressure to the motor 44 is under the control of the operator, a control valve 80 being diagrammatically indicated in Figure 2.

It is believed the operation of the mechanism is apparent from the foregoing, but it will be reviewed briefly for completeness. With the parts in the position illustrated in Figure 1 it will be observed that the hooks 76 of the slides 70 are engaged with the hooks 78 of the lowermost mold 18. It will further be observed that the upper compartments 14 and 12 have molds 18 therein. It is accordingly assumed that the operator is just commencing to remove the molds from the press 10. With the parts in the position illustrated in Figure 1, the rotary motor 44 is energized to move the slides 70 to the left, thus withdrawing the lowermost mold from the press and moving it to a position on the top of the table 32. At this time the press may be removed from the table by any suitable means effective to lift the mold directly upwardly from the table, thus disengaging the hooks 76 and 78. Thereafter, the slides 70 are again traversed to the right into alignment with the hooks 78 on the next mold 18 and the valve 38 is opened to admit fluid to elevate the table 32 to a position in which the hooks 76 on the slides 70 engage the hooks 78 on the next mold. From the foregoing it will be observed that to remove the molds the table is elevated to a position to cause the hook portions to engage, and the molds are removed from the table by vertical upward movement therefrom to disengage the hooks.

Loading the molds into the compartments of the press involves substantially the converse, the molds being moved downwardly onto the table so as to move the hook portions 76 and 78 into engagement. Thereafter, the slides 70 are traversed to the right, thus inserting the molds into the compartments of the press and the hook portions are disengaged by vertical movement of the table to move the hook portions 76 out of alignment with the hooks 78.

For clarity, in Figure 1 the parts are illustrated in an arrangement in which the molds are not fully inserted into the compartments of the press 10. Of course if the press is associated with means for vulcanizing rubber contained in the molds, the hooks 76 on the slides 70 may be extended so as to move the molds fully into the compartments in order to permit closure of the open front thereof if desired.

While the valve control means for the vertical power means and the rotary motor 44 are diagrammatically indicated as simple valves, it will of course be appreciated that if desired these valves may be associated with conventional stop means so that the table 32 is moved step by step to exactly positioned elevations corresponding with the compartments, and the stroke of the slides 70 may similarly be preset and accurately controlled.

From the foregoing it will be observed that very convenient mechanism is provided for moving the relatively heavy molds into horizontal alignment with the compartments of the press and for thereafter sliding the molds into the compartments, the process being simply reversed for removal of the molds therefrom.

The drawings and the foregoing specification constitute a description of the improved mold handling mechanism in such full, clear, concise and exact terms as to enable any person skilled in the art to practice the invention, the scope of which is indicated by the appended claim.

What I claim as my invention is:

Mold handling mechanism for use in inserting and removing a series of molds in and from a plurality of vertically spaced compartments in a press provided with a ram for lifting movable platforms to apply pressure to the series of molds, said mechanism comprising a hollow support table having a flat horizontal top surface over which the molds are slidable, said table comprising a center plate, a pair of side plates on opposite sides of said center plate spaced laterally from the side edges of said center plate to expose the interior of said table, a power lift mechanism connected to said table for raising and lowering the table to align it selectively with compartments in said press, sprocket members spaced longitudinally of said support table, chain members on said sprocket members and movable through the interior of said table, slide means comprising a pair of horizontal members each spanning the space between said center plate and one of said side plates and engaging in sliding relation the top surface of said center and side plates, guide means extending from each of said members into the space between said center plate and one of said side plates, each of said guide means including edge portions in proximity to the side edges of the center and side plates for maintaining the horizontal member in proper alignment on said plates, and a depending flange on each of said horizontal members connected to one of said chain members, power means fixed relative to said table for driving said sprocket means, and releasable coupling means on said horizontal members selectively engageable with a mold to insert it in or move it from a press compartment.

References Cited in the file of this patent

UNITED STATES PATENTS

| | | |
|---|---|---|
| 1,876,171 | Rosener | Sept. 6, 1932 |
| 2,526,823 | Mansfield | Oct. 24, 1950 |
| 2,593,012 | Croston | Apr. 15, 1952 |
| 2,656,048 | Samler | Oct. 20, 1953 |
| 2,699,878 | Avery | Jan. 18, 1955 |
| 2,707,666 | Becker | May 3, 1955 |
| 2,726,775 | Howard | Dec. 13, 1955 |